US011365531B2

(12) United States Patent
Kuhlman

(10) Patent No.: US 11,365,531 B2
(45) Date of Patent: Jun. 21, 2022

(54) MOUNTABLE WATERING ASSEMBLY

(71) Applicant: Timothy Kuhlman, Lincoln, NE (US)

(72) Inventor: Timothy Kuhlman, Lincoln, NE (US)

( * ) Notice: Subject to any disclaimer, the term of this patent is extended or adjusted under 35 U.S.C. 154(b) by 648 days.

(21) Appl. No.: 16/366,853

(22) Filed: Mar. 27, 2019

(65) Prior Publication Data

US 2019/0323213 A1 Oct. 24, 2019

Related U.S. Application Data

(60) Provisional application No. 62/648,415, filed on Mar. 27, 2018.

(51) Int. Cl.
*E03C 1/02* (2006.01)
*F16L 3/123* (2006.01)
*F16L 3/12* (2006.01)

(52) U.S. Cl.
CPC .............. *E03C 1/021* (2013.01); *F16L 3/123* (2013.01); *F16L 3/1218* (2013.01)

(58) Field of Classification Search
CPC .......... F16L 3/1218; F16L 3/123; F16L 7/00; A47K 3/285; E03C 1/021
See application file for complete search history.

(56) References Cited

U.S. PATENT DOCUMENTS

| | | | | |
|---|---|---|---|---|
| 1,799,815 A * | 4/1931 | Hoff | ........................ | E03C 1/066 4/615 |
| 3,730,228 A * | 5/1973 | Gibbs, Sr. | ............... | E03F 1/008 138/155 |
| 4,934,001 A * | 6/1990 | Landreth | ................. | A47K 3/285 4/615 |
| 5,660,164 A * | 8/1997 | Rodriguez Sanchez | ..................... | A47K 3/283 4/599 |
| 5,983,419 A * | 11/1999 | Carroll | .................... | A47K 3/285 4/615 |
| 5,996,142 A * | 12/1999 | Colman | ................. | A47K 3/285 4/615 |
| D457,605 S * | 5/2002 | Balish, Jr. | ............... | A47K 3/285 D23/283 |
| 10,655,310 B2 * | 5/2020 | Lee | ........................ | E03C 1/0408 |
| 2002/0144341 A1 * | 10/2002 | Zieger | ..................... | E03C 1/021 4/605 |
| 2006/0010784 A1 * | 1/2006 | Lee | ......................... | E03C 1/021 52/20 |
| 2006/0021655 A1 * | 2/2006 | Garver | .................. | F16L 41/021 137/356 |

(Continued)

FOREIGN PATENT DOCUMENTS

AT 15972 U1 * 10/2018
CH 694187 A5 * 8/2004 ............. E03C 1/021

(Continued)

*Primary Examiner* — Eret C McNichols
(74) *Attorney, Agent, or Firm* — Jonathan B. David

(57) ABSTRACT

A mountable watering assembly may include a main column member, base, front bracket, spacer bracket, fasteners, a capping assembly, and a back bracket. One or more adjustable spacers may be disposed between the front bracket and the spacer bracket. A tap and a hose may be coupled to the main column member or to a hose assembly disposed within the main column member. The mountable watering assembly may be mounted on a railing system. One or more panels may be coupled to the main column member.

12 Claims, 11 Drawing Sheets

(56) References Cited

U.S. PATENT DOCUMENTS

| | | | | |
|---|---|---|---|---|
| 2010/0012748 | A1* | 1/2010 | Tsai | F24S 60/30 |
| | | | | 126/596 |
| 2010/0058532 | A1* | 3/2010 | Tsai | F24H 1/06 |
| | | | | 4/612 |
| 2016/0109039 | A1* | 4/2016 | Munsch | H02G 3/0487 |
| | | | | 248/49 |
| 2018/0051831 | A1* | 2/2018 | Gilbert | F16L 9/18 |
| 2019/0085540 | A1* | 3/2019 | Thadhani | E03C 1/0408 |
| 2020/0003347 | A1* | 1/2020 | Ball | F16L 27/12 |
| 2020/0256213 | A1* | 8/2020 | Troughton | F01D 25/20 |
| 2021/0404588 | A1* | 12/2021 | Wolf | F16L 39/005 |

FOREIGN PATENT DOCUMENTS

| | | | | |
|---|---|---|---|---|
| CN | 104089086 A | * | 10/2014 | F16K 51/00 |
| CN | 215062926 U | * | 12/2021 | E03C 1/021 |
| EP | 0819402 A1 | * | 1/1998 | |
| JP | 06331062 A | * | 11/1994 | E03C 1/021 |
| JP | 2005120715 A | * | 5/2005 | |
| KR | 200435127 Y1 | * | 1/2007 | F16K 51/00 |

* cited by examiner

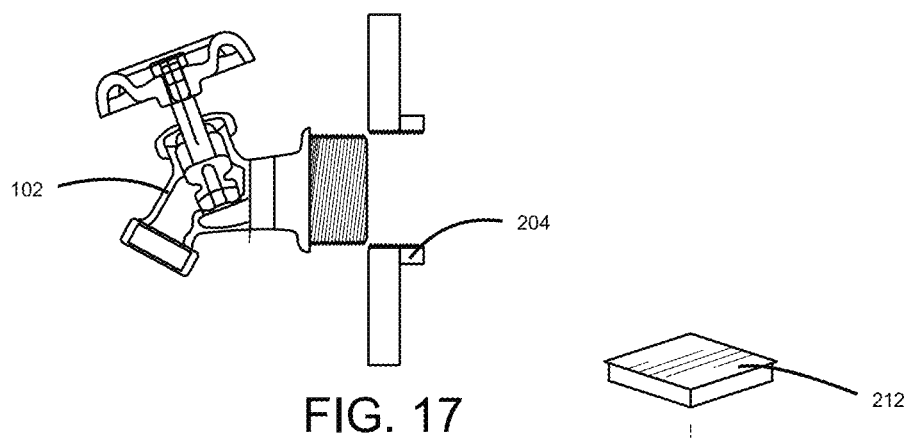
FIG. 17
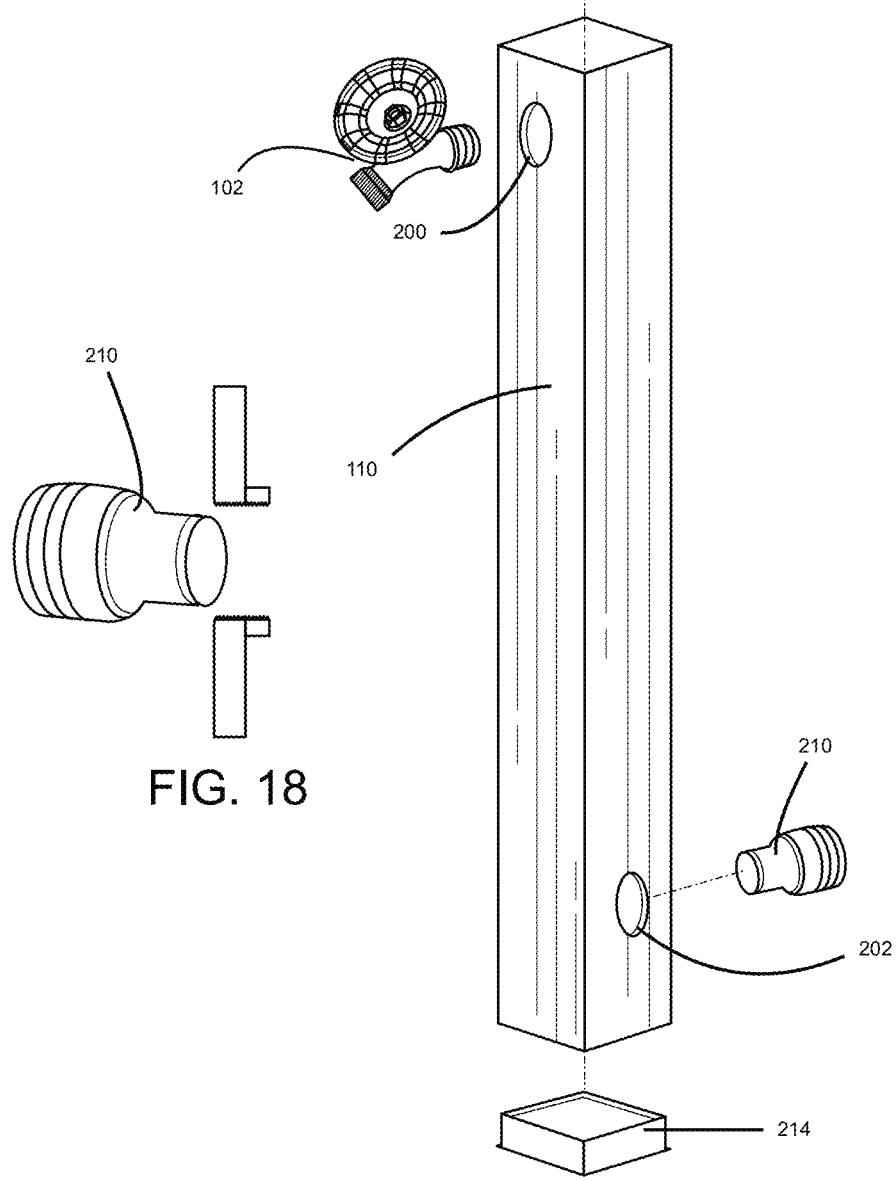
FIG. 18
FIG. 19

MOUNTABLE WATERING ASSEMBLY

RELATED APPLICATION

This application incorporates by reference and claims the benefit of the provisional application filed on Mar. 27, 2018 and having a Ser. No. 62/648,415.

BACKGROUND OF THE INVENTION

1. The Field of the Invention

The present invention relates generally to apparatus and systems for providing a water outlet. More specifically, a pressurized water-termination point elevated above the ground.

Disclaimer

For purposes of this provisional application, the specification shall govern above anything in the figures. Any language in the figures such as "must", "must have", "always" shall be replaced with "may", "may have" and "sometimes". Any language in the figures such as "cannot" is replaced with language such as "may not necessarily have". The figures are illustrative, give examples, and are not supposed to limiting. Coupled means to be in direct or indirect contact with another object; in preferred embodiments two or more objects that are coupled may be affixed by some type of physical or nonphysical means such as glue, screw, nail, mating connections, threaded connections, soldering, which also includes being detachably affixed which means that a substantially temporary means has been used to affix the two or more objects. As mentioned above, indirect coupling includes Object A being coupled to Object B and Object C being coupled to Object B would mean that Object A is coupled to Object C even if Object A is not physically contacting Object C. Additional elements may be coupled to each other in this manner.

2. Background

Plumbers and contractors may use pipes and other devices to provide a water outlet. There are outdoor sinks. A Bi-channel manifold that also have an inlet for coupling to a threaded spigot are known in the art.

A need exists for simpler methods and apparatus for providing a water outlet, including providing a water outlet on or near structures such as deck or balcony in which a user desires to conveniently install a removable water outlet without marring a structure such as a deck, balcony, or railing system.

SUMMARY OF THE INVENTION

The mountable watering assembly may allow for water access. The mountable watering assembly may be coupled to, detachably coupled to, or attached to a railing system such as a plurality of rails, that may be wooden or metal or plastic, that form a fence around a deck or other structure. Unless explicitly mentioned, the claims disclaim the railing system and any mention of the railing system is to clarify the physical orientation of a mountable watering assembly with respect to a railing system. In some embodiments the water access may be constant, controllable, or pressurized; the water access may be delivered by a standard garden hose, hose, or other conduit. A mountable watering assembly may be installed in various locations; in some preferred embodiments the mountable watering assembly may be located in any above-freezing environment. The mountable watering assembly may have a solid mounting base configured to receive a standard garden-hose (¾" GHT), in either male or female thread pattern, and may provide a thru-connection to a distribution point—which may be a male garden hose connection, a built-in shut-off valve, or a built-in quick-disconnect female receiver. In some preferred embodiments, threaded connections may have a washer or O-ring as an integral piece.

The mountable watering assembly may have a multi-manifold. A number of mountable watering assembly may be used with a number of raised gardening beds such as wood beds. When two or more mountable watering assembly are used, the mountable watering assembly may be coupled to each other via one or more conduits. Electronic valve controls may be used with the mountable watering assembly or the number of mountable watering assembly.

In some embodiments a mountable watering assembly may include detachable hoses. A secondary base may be attachable to a post or wall, which may be movable or substantially non-movable. The secondary base may be attached to the post or wall by a fastener such as a screw or by a less intrusive device such as a bracket, strap, suction cup, or clamp. The primary base may be detachably coupled to the secondary base; or in some preferred embodiments the primary base is directly coupled to a post or wall. In the preferred embodiments, the primary base may be coupled to the joining portion.

The mountable watering device may be screwed into a surface, such as a rock surface, a wooden surface, metal surface or plastic surface. The mountable watering assembly may be used with a deck such as a wooden, vinyl, or steel deck.

A first outlet or second outlet may be a quick disconnect coupling. The first outlet or second outlet may be coupled to a quick disconnect hose. In some embodiments, a piece of property may have one or more mountable watering assemblies located at different locations. The mountable watering assembly may have quick disconnect couplings coupled to the first outlet or the second outlet. A user may carry a quick disconnect hose by hand and move to the different mountable watering assembly. The user may then quickly couple the quick disconnect hose to an outlet of the mountable watering assembly and then receive water through the house.

The mountable watering assembly may be coupled by hoses, such as garden hoses, to a spigot or tap that is connected to pipes, hoses, or conduits carrying running water. The hoses may be placed strategically under mulch or other materials so as to not expose the hoses to the view of people or to the elements such as rain.

A shutoff valve may be coupled to a first outlet or a second outlet. In the preferred embodiments a shutoff valve may be coupled to the first outlet. The shutoff valve may have a ball valve. Various adapters may be connected to the one or more outlets thereby converting a male outlet to a female outlet or vice versa. A plug may be attached to one or more of the outlets.

The mountable watering assembly or mountable watering device may be coupled to a shrinking pocket hose. The mountable watering assembly or the mountable watering device may have a number of bleed valves.

The mountable watering assembly may have a hollow or semi-hollow portion to allow for unobstructed passage of water, liquids, or gases through the hollow or semi-hollow portion. In some embodiments, a valve may be coupled to the hollow portion or semi-hollow portion, allowing for a user to open, close, partially open or partially close the hollow portion or semi-hollow portion. unobstructed passage of water/liquid through its interior.

Prior to distribution of water at the 'utilization point', the water pressure may be restricted or controlled with the integration of a shut-off valve, which may be of a ball variety or other type. Some of the parts which may be used with embodiments of the invention are hoses, valves, quick-disconnect hoses, threaded connections, washers, screws, and O-rings.

The mountable watering assembly may have connectors or couplers for a standard ¾ inch GHT connector.

For freeze protection of hoses, that is the removal of water in hoses before they freeze, the placement of hoses may be important; thus, there may be advantages to connecting a spigot on a house. Using prior art systems, placing a spigot away from the house may provide challenges, since the water source may need to be turned off before freezing temperatures and drained prior to freezing temperatures. In many localities, domestic water pressure is targeted around 80 psi. Various material may be used including cast zinc.

Coupled means to be in direct or indirect contact with another object; in preferred embodiments two or more objects that are coupled may be affixed by some type of physical or nonphysical means such as glue, screw, nail, mating connections, threaded connections, sliding one or more portions of an assembly or part of an assembly through a slot on another object, or soldering, which also includes being detachably affixed to one or more objects. Nonphysical means include magnetic forces. Detachably coupled refers to frictional contact between the two objects can be easily removed by gravity or other weak force. An object may be simultaneously coupled to and detachably coupled to another object. As described below a mounting assembly may be used so that a first object is detachably coupled to a railing, while at the same time being coupled to the railing, such that when the coupling to the railing is removed, then the object is only detachably coupled, which may be removed by gravity or the pulling force of an average human user. As mentioned above, indirect coupling includes Object A being coupled to Object B and Object C being coupled to Object B would mean that Object A is coupled to Object C even if Object A is not physically contacting Object C. Additional elements may be coupled to each other in this manner.

Embodiment(s) 1

A mountable watering assembly (100) configured for mounting to one or more rails, the mountable watering assembly (100) comprising:
a main column member (110) coupled to a front plate 140 of a mounting assembly a tap (102) coupled to a tap connector selected from the group consisting of a) an upper outlet (200) of the main column member (110) and b) a first elbow connector (600) of a water conduit assembly (6000) wherein a first end (606) of the water conduit assembly (6000) is coupled to the first elbow connector (600) being at least partially disposed within the main column member (110) 110 and wherein a second end (608) of the water conduit (603) assembly is coupled to a second elbow connector (600*b*) being at least partially disposed within the main column member (110);
a hose connector (210) coupled to an object selected from the group consisting of c) a lower inlet (202) of the main column member (110) and d) the second elbow connector (600*b*) of the water conduit assembly (6000); and,
a base (1218) coupled to the main column member (110), the base (1218) selected from a group consisting of a detachable base comprising at least one foot, an undetachable base (1218), a plate (1000), the plate (1000) comprising at least one foot, and an arched base (1216).

Embodiment(s) 2

The mountable watering assembly (100) of Embodiment(s) 1 wherein the base (1218) is the plate (1000) comprising two rubber feet.

Embodiment(s) 3

The mountable watering assembly (100) of Embodiment(s) 1, wherein the mounting assembly (120) is a simple mounting assembly (300) comprising a first fastener (122), a second fastener (124), the front plate (140), a back plate (144), a first fastener capping assembly (126), a second fastener capping assembly (128), wherein the first fastener (122) is coupled is coupled to the front plate (140), the back plate (144), and the first fastener capping assembly (126), wherein the second fastener (124) is coupled to the front plate (140, the back plate (144), and the second fastener capping assembly (128).

Embodiment(s) 4

The mountable watering assembly (100) of Embodiment(s) 3 wherein the front plate (140) comprises
a first spacer slot (502) defining a slot cavity (503), the first spacer slot (502) comprising
a first spacer slot ledge (504) and a second spacer slot ledge (506);
a second spacer slot (508) defining a slot cavity (509), the second spacer slot (508) comprising a third spacer slot ledge (510) and a fourth spacer slot ledge (511);
a first fastener (122) slot wherein a lower horizontal length of the first fastener slot (512) is greater than an upper horizontal length of the first fastener slot (512);
a second fastener slot (514) wherein a lower horizontal length of the second fastener slot (514) is greater than the upper horizontal length of the second fastener slot (514).

Embodiment(s) 5

The mountable watering assembly (100) of Embodiment(s) 3, wherein the front plate (140) is detachably coupled with a substantially horizontal first rail (1200), is coupled with a first fastener (122), is coupled with a second fastener (124), and is detachably coupled with a substantially horizontal second rail (1202), wherein the back plate (144) is detachably coupled with the first rail (1200) and the second rail (1202), wherein the first fastener (122) is capped by a first fastener capping assembly (126) and disposed within a first aperture (900*c*) of a back plate (144) and wherein the second fastener (124) capped by a second fastener capping assembly (128) and disposed within a second aperture (900*d*) of the back plate (144) coupled to the first fastener (122) and coupled to the second fastener (124).

Embodiment(s) 6

The mountable watering assembly (100) of Embodiment(s) 4, further comprising a panel assembly, the panel assembly comprising at least one panel selected from a group consisting of an upper panel (1210) coupled to an upper half of the mountable watering assembly (100) and a lower panel (1212) coupled to a lower half of the mountable watering assembly.

Embodiment(s) 7

The mountable watering assembly (100) of Embodiment(s) 6, wherein the tap (102) connector is a first elbow connector (600) of a water conduit (603) assembly wherein a first end (606) of the water conduit (603) assembly is coupled to the first elbow connector (600) elbow connector (600*b*) at least partially disposed within the main column member (110) 110 and wherein a second of end (606) of the water conduit assembly (602) is coupled to a second elbow connector (600*b*) at least partially disposed within the main column member (110); wherein a hose connector (210) is coupled to the second elbow connector of the water conduit assembly (602).

Embodiment(s) 8

The mountable watering assembly (100) of Embodiment(s) 1 wherein the main column member (110) is between 18 inches to 32 inches in height.

Embodiment(s) 9

The mountable watering assembly (100) of Embodiment(s) 1 wherein the mounting assembly (120) is a complex mounting assembly 302 comprising a first compressible spacer 800*a*, a second compressible spacer 800*b*, a spacer plate (142), a first fastener (122), a second fastener (124), the front plate (140), a back plate (144), a first fastener (122) capping assembly, a second fastener (124) capping assembly, wherein the first fastener (122) is coupled is coupled to the front plate (1000) (140, 140 such), the back plate (1000) (144), and the first fastener capping assembly (126) wherein the second fastener (124) is coupled to the front plate (140), the back plate (144), and the second fastener (124) capping (128).

Embodiment(s) 10

The mountable watering assembly (100) of Embodiment(s) 9, wherein
 the first compressible spacer (800*a*) further comprises
  at least three vertical-length grooves (1220*a*, 1220*b*, 1220*c*)
  a first notch (1230*a*),
  a first channel (1240*a*) adjacent to the first notch (1230*a*) and configured to mate with the front plate (140),
  a second channel (1240*b*) adjacent to the first notch (1230*a*) and configured to mate with the front plate (140);
 wherein the second compressible spacer (800*b*) further comprises at least three vertical-length grooves (1220*d*, 1220*e*, 1220*f*),
  a second notch (1230*b*),
  a third channel (1240*c*) adjacent to the second notch (1230*b*) and configured to mate with a first spacer slot (502) of the front plate (140),
  a fourth channel (1240*d*) adjacent to the second notch (1230*b*) and configured to mate with the front plate (140);

Embodiment(s) 11

The mountable watering assembly (100) of Embodiment(s) 10 wherein the first compressible spacer has a hand-broken edge.

Embodiment(s) 12

The mountable watering assembly (100) of Embodiment(s) 11 further comprising a panel assembly, the panel assembly comprising at least one panel selected from a group consisting of an upper panel (1210) coupled to an upper half of the mountable watering assembly (100), a lower panel (1212) coupled to a lower half of the mountable watering assembly (100), and an upper panel (1210) coupled to the upper half of the mountable watering assembly (100) and a lower panel (1212) coupled to the lower half of the mountable watering assembly (100).

Embodiment(s) 13

The mountable watering assembly (100) of Embodiment(s) 12 further comprising a column cap (190) detachably coupled to an upper end (606) of the main column member (110).

Embodiment(s) 14

The mountable watering assembly (100) of Embodiment(s) 13 wherein the spacer plate (142) comprises a first ridge (150) perpendicular to a main length of the elongated spacer plate (142), a second ridge (152) perpendicular to the length of the elongated spacer plate (142), a third ridge (154) perpendicular to the length of the elongated spacer plate (142), a fourth ridge (156) perpendicular to the length of the elongated spacer plate (142), wherein the first ridge (150) and the second ridge (152) collectively define a first channel (160*a*), wherein the third ridge 154 and the fourth ridge 156 collectively define a second channel 160*b*.

Embodiment(s) 15

A mountable watering assembly (100) comprising a tap (102) selected from a group consisting of a hose bibb, a spigot, and sillcock;
 a conduit (603) carrying water;
 a main column member (110) comprising a substantially-perpendicular elongated front plate (140), the main column member (110) comprising a substantially hollow column body (2000), the column body (2000) being substantially rigid, wherein the main column member (110) is configured to substantially engulf a water transport assembly disposed within the 0) configured to conduct a body of flowing fluid;
 the main column member (110) comprising an upper threading flange (204) and a lower threading flange (may be a nut or threaded thickness internally disposed behind the upper outlet or behind the lower inlet which may allow for the extension of the threaded surface at the inlet (202) and outlet (200) and thereby allowing sillcock, threaded hose, or connector to be threadedly attached);
 a mounting assembly (120), the mounting assembly (120) comprising
  a first fastener (122);
  a second fastener (124);
  a front plate (140);
  an elongated back plate 144;

a first fastener capping assembly 126 (may be a hex-nut holder 129*a* and a hex nut 131*a* such as a ⅜-inch hex nut);

a second fastener capping assembly 128 may be a hex-nut holder 129*b* and a hex nut 131*b* such as a ⅜-inch hex nut);

a base (1218) selected from a group consisting of a detachable base comprising at least one foot, an undetachable base (1218), a plate (1000), a plate (1000) comprising at least one foot, and an arched base (1216); and, a main column member (110) comprising an elongated front plate (140), the main column member (110) being substantially hollow and configured to conduct a body of flowing fluid; the main column member (110) comprising a threading flange.

Embodiment(s) 16

The mountable watering assembly (100) of Embodiment(s) 15 further comprising at least two compressible, hand-adjustable spacers, at least one spacer plate (142), wherein the at least two spacers (800*a*, 800*b*) are frictionally disposed between the front plate (140) and the spacer plate (142), wherein the first fastener (122) and the second fastener (124) are disposed between the spacer plate (142) and the back plate (144) and capped by at least one capping assembly (such as 126), wherein the first fastener (122) is disposed in and penetrating through a first opening 900*a* of the spacer plate 142 and a first opening 900*c* of the back plate (144), wherein the second fastener (124) is disposed in and penetrating through a second opening 900*b* of the spacer plate (142) and a second opening 900*d* of the back plate (144).

BRIEF DESCRIPTION OF THE DRAWINGS

The preferred embodiments of the present invention will be described in conjunction with the appended drawings. Various sizes and shapes and configurations of the parts of the mountable watering assembly are contemplated; various sizes of fasteners may be used depending on size and spacing of the rails of a railing system, such as a railing system that may be installed on a deck. Like designations denote like elements, and:

FIG. 17 depicts an alternative of the embodiment shown in FIG. 2B;

FIG. 18 shows a hose connector near a threaded inlet;

FIG. 19 shows an embodiment of a mountable watering assembly.

DETAILED DESCRIPTION OF EMBODIMENTS OF THE INVENTION

Figure 1:
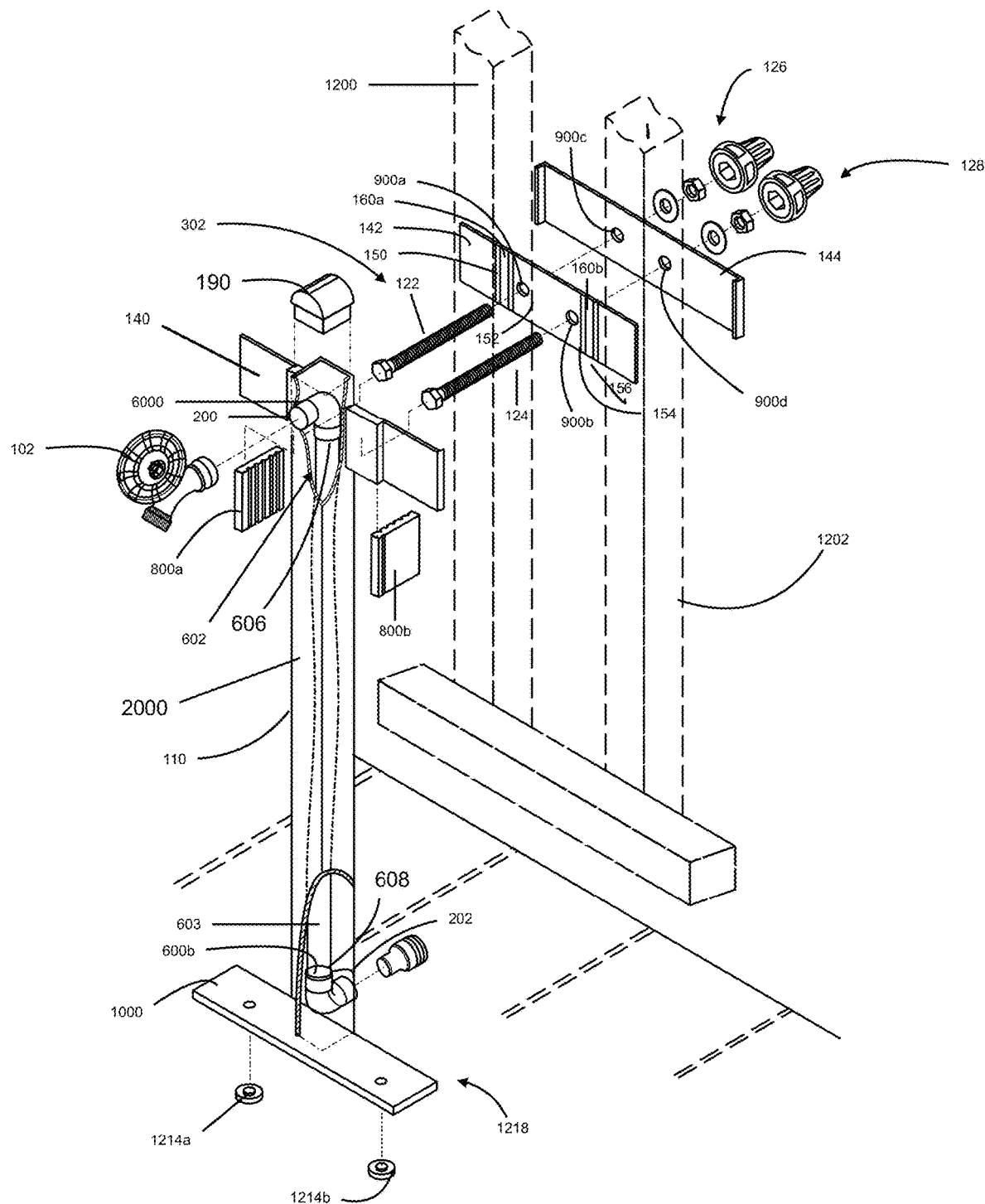
FIG. 1 depicts an isometric view of a mountable watering assembly.
Figure 7:
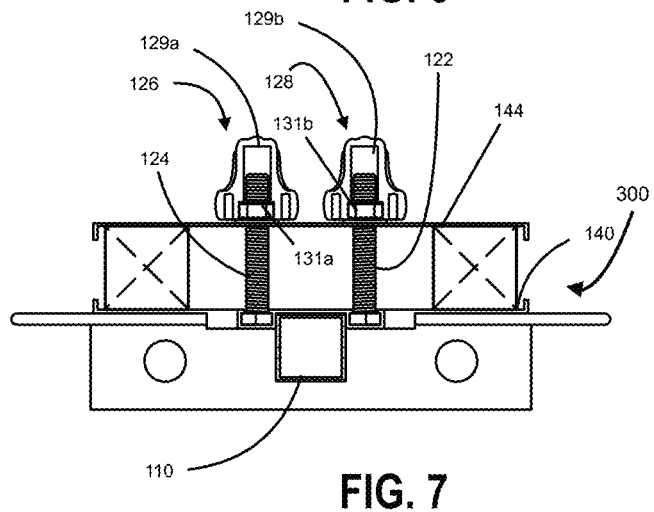
FIG. 7 shows an embodiment to the mountable watering assembly as depicted in FIG. 6 except that a simple mounting assembly is depicted in which the spacer plate and spacers are intentionally not included in this embodiment.
Figure 8:
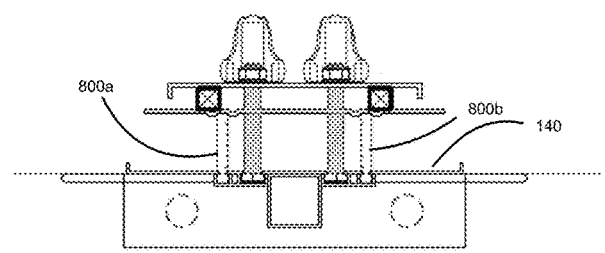
FIG. 8 shows an alternative embodiment of the mountable watering assembly shown in FIG. 6.
Figure 9:
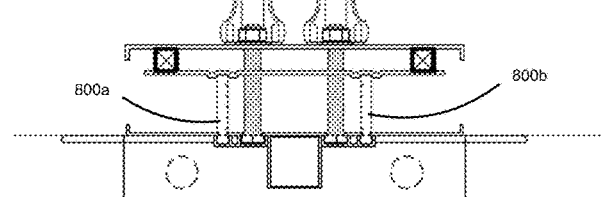
FIG. 9 shows alternative embodiment of the mountable watering assembly shown in FIG. 6.
Figure 11:
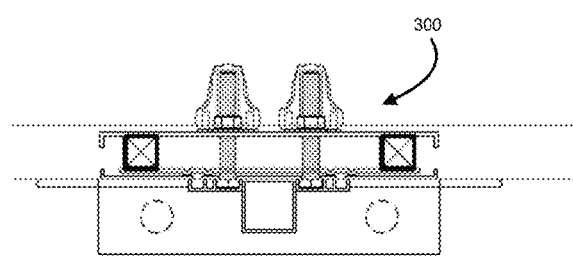
FIG. 11 shows an alternative embodiment of the mountable watering assembly shown in FIG. 6.
Figure 10:
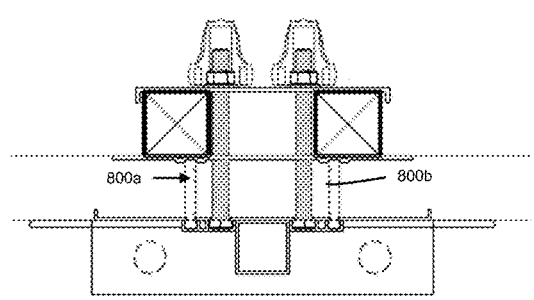
FIG. 10 shows an alternative embodiment of the mountable watering assembly shown in FIG. 6.
Figure 12:
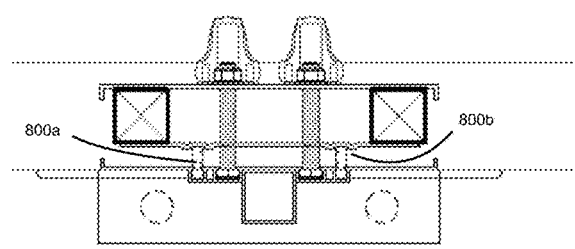
FIG. 12 shows an alternative embodiment of the mountable watering assembly shown in FIG. 7.
Figure 13:
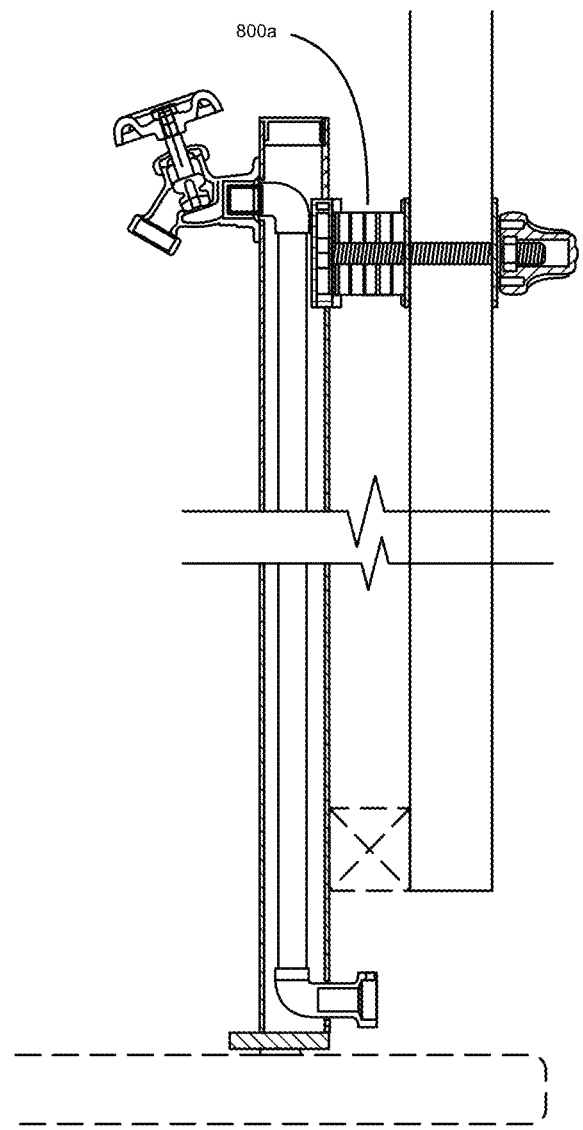
FIG. 13 shows an enlarged view of the mountable watering assembly depicted in FIG. 2B; no panel is depicted.
Figure 14:
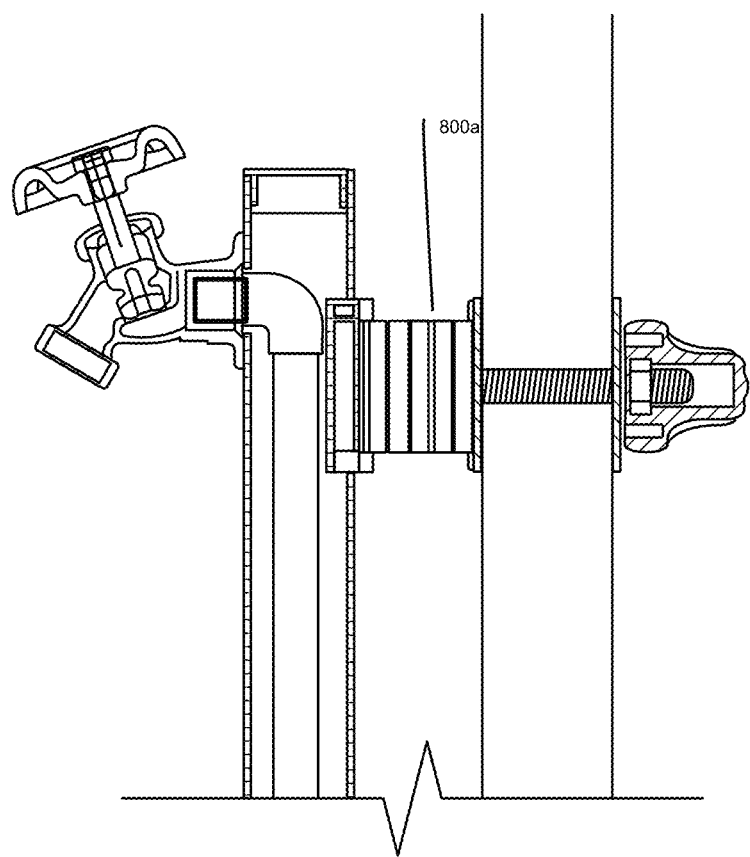
FIG. 14 shows an enlarged view of the upper portion of the embodiment shown in FIG. 13.

A complex mounting assembly 302 is shown in FIG. 1; a simple mounting system is shown in FIG. 7; since a simple mounting assembly with one or more spacers and one or more spacer plates is deemed a complex mounting assembly, the disclosure will discuss both mounting systems in the context of FIG. 1. The mountable watering assembly 100 may be coupled or detachably coupled to a railing system, which may have vertical, horizontal, offset, or diagonal rails, via a simple mounting assembly 300 or a complex mounting assembly 302; when the mountable watering assembly 100 is coupled or detachably coupled to a railing system, the simple mounting assembly 300 may include a front plate 140 that is coupled or detachably coupled (in the preferred embodiments to at least one rail; simple mounting assembly 300 may also include a back plate that is coupled or detachably coupled to the least one rail. In the preferred embodiments, the front plate 140 is frictionally coupled to the forward-facing surfaces of one or more rails and the back plate 144 is frictionally coupled to the backward-facing surfaces of the one or more rails. Additionally, one or more bolts may be coupled to the backside of the front plate; a first fastener may be disposed within a first aperture of the back plate, a second fastener may be disposed within a second aperture of the back plate. The fastener head of the first fastener may be inserted at a slot that opens from the backside of the front plate 140 such that the slot is tapered or more narrower at the top than the bottom, such that when a fastener has been inserted into the slot, then the fastener head may catch against the walls surrounding the slot; the bold head of the second fastener may be inserted into a second slot that opens from the backside of the front plate 140 such that the second slot may tapered or more narrower at the top than the bottom, such that when a fastener has been inserted into the slot from the bottom of the slot and then raised, then the fastener hade may catch against the edge of the upper portion of the front plate 140 defining the slot.

A complex mounting assembly 302 refers to a simple mounting assembly that also has the addition of a spacer plate and at least two spacers disposed between the front plate 140 and the back plate.

Referring to FIG. 1, an embodiment of a mountable watering assembly 100 is depicted. A base 1218 may include a plate 1000, which may also include one or more rubber foot 1214*a* and one or more rubber foot 1214*b*. A mountable watering assembly 100 may be coupled to a front plate 140. In FIG. 1 a tap 102 may be coupled to a tap connector such as a first elbow connector 600 of a water conduit assembly 602 that may be disposed within or partially disposed within an outlet 200 the main column member. In FIG. 1 due to the cutaway, the outlet 200 is not fully shown; outlet 200 is any area defining an opening that may be of any shape but in some preferred embodiments is circular. Water conduit assembly 6000 may have a conduit 603 such as a hose, hosing, a pipe, piping for conducting water. Water conduit assembly 6000 may also have a lower inlet 202, and a lower elbow connector 600*b* that may be coupled to a lower end 608 the water conduit assembly 6000. A hose connector 210 may be coupled to elbow connector 600*b*.

A main column member may be coupled to a front plate 140 of a mounting assembly; a complex mounting assembly 302 may include the front plate 140, a spacer plate 142, an at least one spacer 800*a*, an at least one spacer 800*b*, and the back plate 144. Although not shown in FIG. 1, the tap 102 may be coupled directly or threadedly coupled to an outlet 200, such as a threaded outlet, of the main column member 110. A tap 102 may be coupled to a tap connector selected from the group consisting of a) an upper outlet 200 of the main column member 110 and b) a first elbow connector 600 of a water conduit assembly 602 wherein a first end of the water conduit assembly 602 is coupled to the first elbow connector 600 at least partially disposed within the main column member and wherein a second of end of the water conduit assembly 602 is coupled to a second elbow connector 600*b* at least partially disposed within the main column member;

A hose connector 210 may be coupled to an object selected from the group consisting of c) a lower inlet 202 of the main column member and d) the second elbow connector 600*b* of the water conduit assembly. In some embodiments a hose connector 210 may be simultaneously coupled with both an inlet 202 and an elbow connector 600*b*.

A spacer plate may define a first fastener aperture 900*a* configured for receiving a shaft end of the first fastener and may define a second fastener aperture 900*b* configured for receiving a shaft end of the second fastener. The spacer plate may also have a plurality of ridges that define one or more channels or grooves for individually and detachably mating or individually or detachably coupling with a spacer, which may be made of rubber.

A back plate may define a third fastener aperture 900*c* configured for receiving a shaft end of the first fastener and may define a fourth fastener aperture 900*d* configured for receiving a shaft end of the second fastener. A capping assembly may then affix a fastener; the capping assembly may include a washer, a nut, and a hex nut, such as a ⅜-inch hex nut, and a hex-nut older. Or in some embodiments the capping assembly may only include a nut. In the embodiments in which a spacer plate may be included, the main column member at a lower portion may abut against a foot rail that is substantially perpendicular to a vertical rail, such as a vertical baluster.

Figure 15:
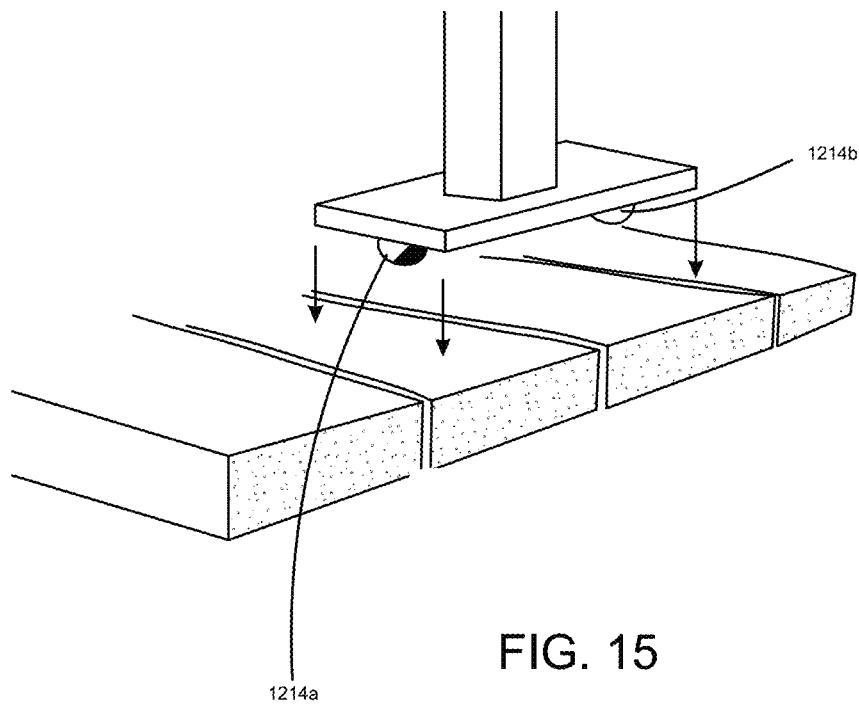
FIG. 15 shows an embodiment of a base.
Figure 16:
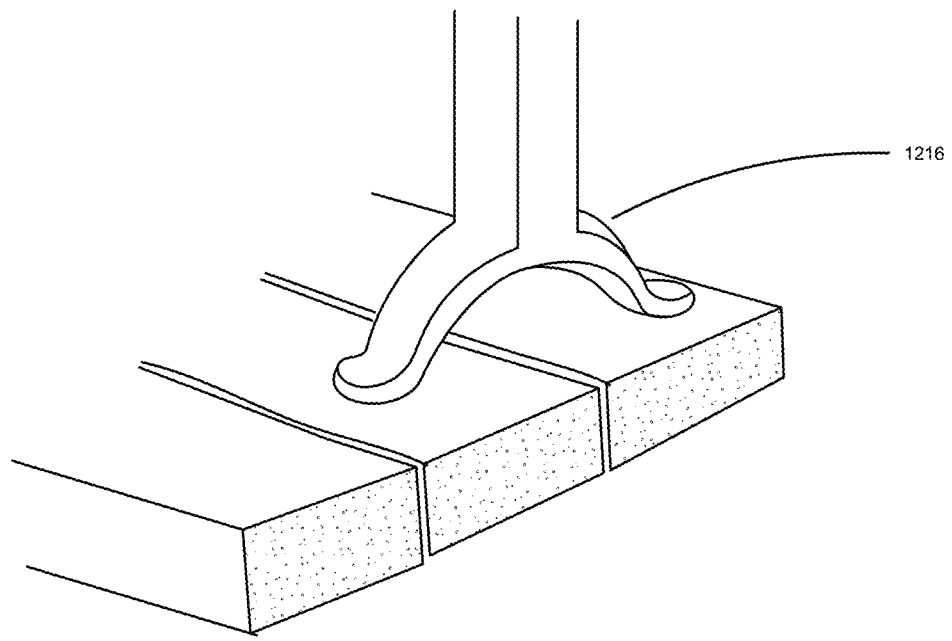
FIG. 16 shows an embodiment of a base.

A base may be coupled to the main column member; the base may be selected from a group consisting of a detachable base comprising at least one foot, an undetachable base, a plate 1000, a plate comprising at least one foot, and an arched base 1216 (see FIG. 16). Referring to FIG. 15, a first rubber foot 1214*a* for the base may be inserted into an aperture of the base; a second rubber foot 1214*b* for the base may be inserted into an aperture of the base.

Figure 2A:
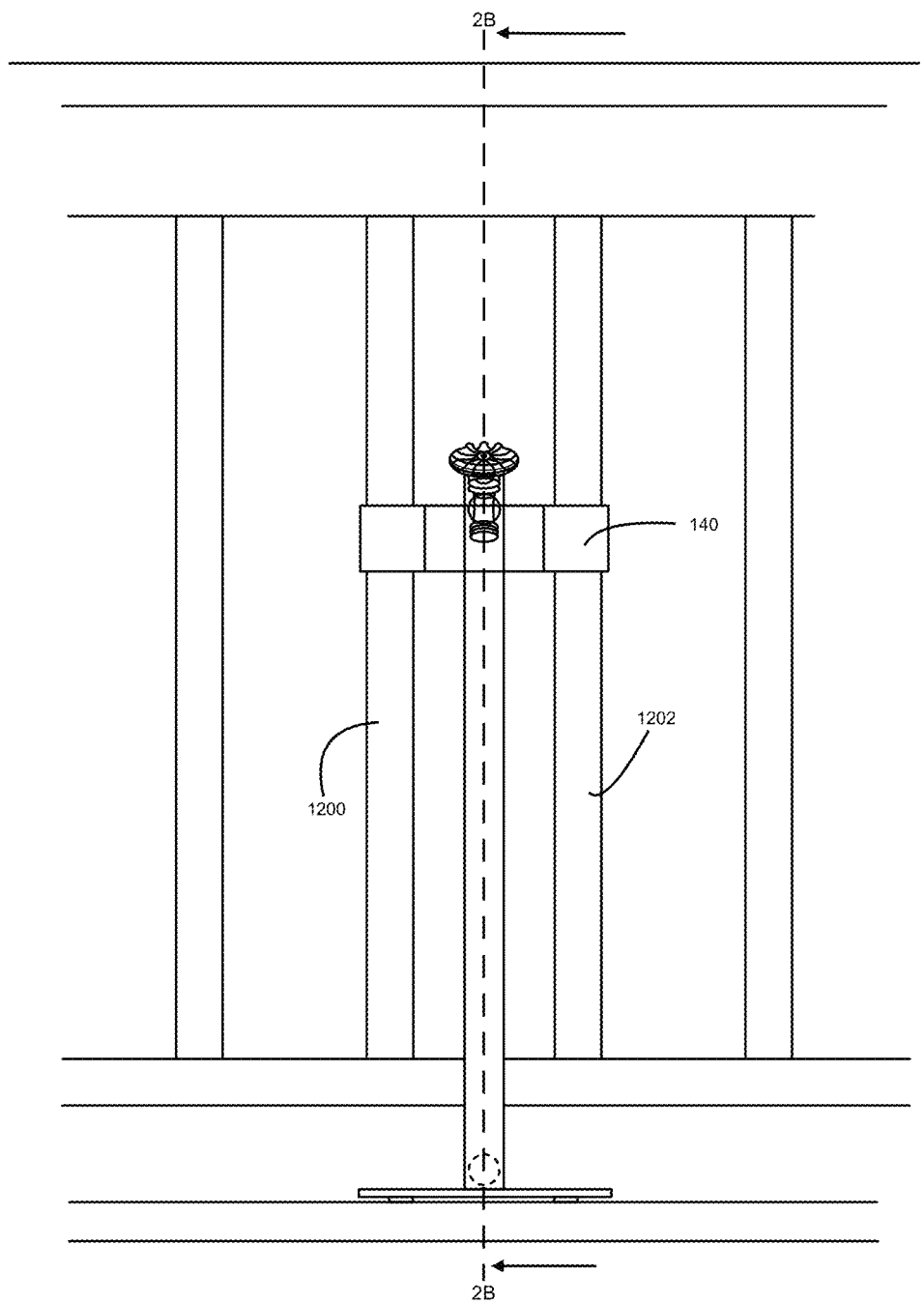
FIG. 2A shows a front view of an embodiment. mountable watering assembly of FIG. 1.
Figure 2B:
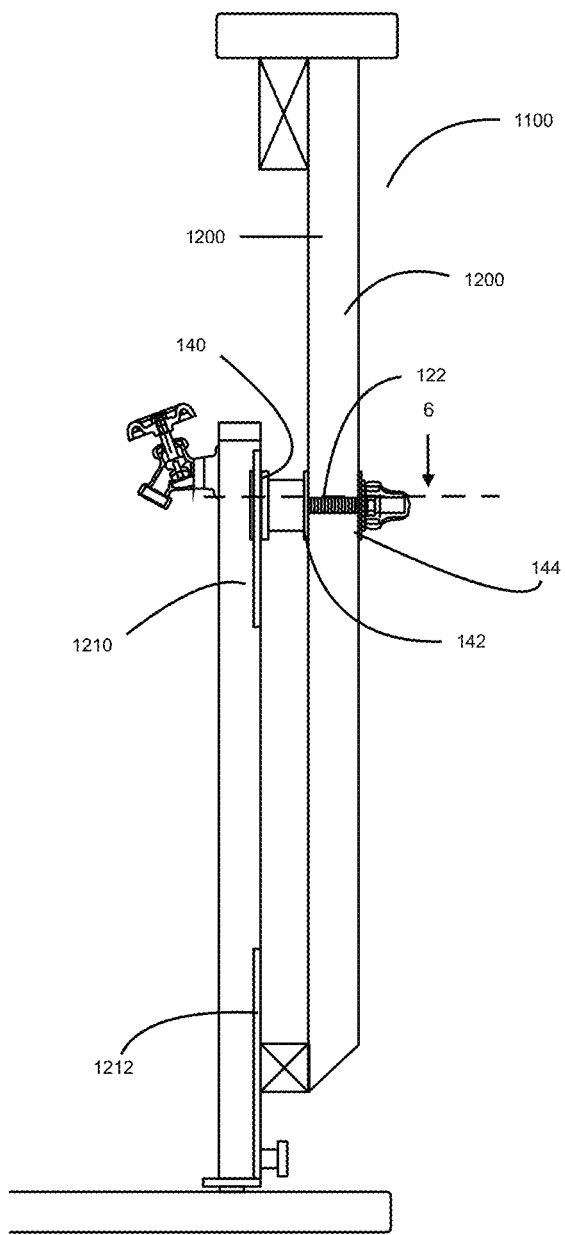
FIG. 2B shows a sectional view of the embodiment of the mountable watering assembly of FIG. 2A; the broken line of FIG. 2A shows the plane upon which the sectional view of FIG. 2B is taken; the arrows pointing towards 2B in FIG. 2A show the direction of sight for FIG. 2B.

Referring to FIG. 2, a mountable watering assembly 100 as mounted to two rails is shown. From the sectional view, the main column member is depicted, with the rubber foot resting on a deck floor (deck floor not claimed), and hose connector protruding from the main column member. A foot rail is shown (parts of the railing system are not claimed) and depicts an "X" in the center of a rectangle shaped edge of a foot rail. A railing system 1100 is depicted, having a vertical rail 1200. Main column member may have a removable top cap; when removed, one may gain access to the inner hollow portion of the main column member, such as when one desires to remove a hose disposed within the main column member.

Figure 3:
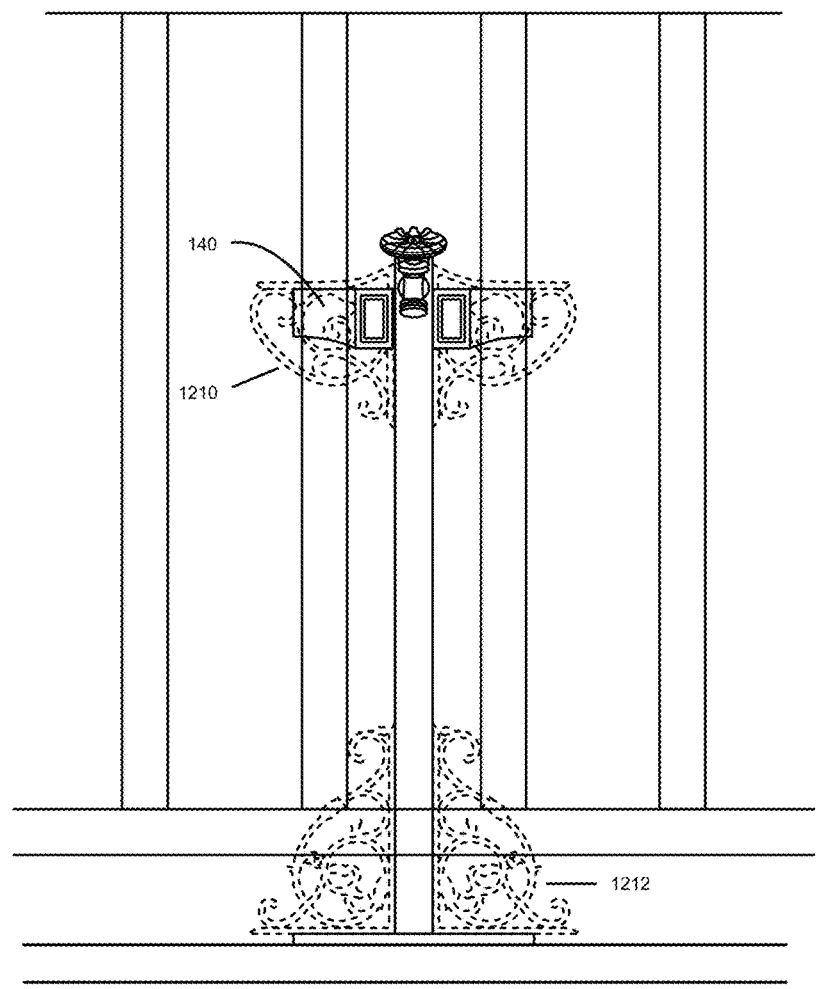
FIG. 3 shows a frontal view of an embodiment of a mountable watering assembly.

Referring to FIG. 3, a mountable watering assembly 100 is shown having a first upper panel and a second lower panel. The panels may be detachably coupled or coupled such as by soldering to the mountable water assembly or the main column member. The panels may be made from cast iron or other materials used for making fencing. The mountable watering assembly of claim 4, further comprising a panel assembly, the panel assembly comprising at least one panel selected from a group consisting of an upper panel 1210 coupled to an upper half of the mountable watering assembly 100, a lower panel 1212 coupled to a lower half of the mountable watering assembly 100, and an upper panel coupled to the upper half of the mountable watering assembly 100 and a lower panel coupled to the lower half of the mountable watering assembly 100

Figure 4:
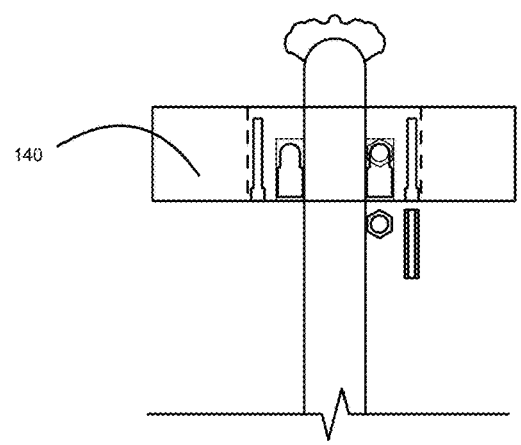
FIG. 4 shows a schematic of a back view of the back plate coupled to the mountable watering assembly of FIG. 2A; four vertical slots are depicted (2 of the slots are for each receiving a fastener, such as a bolt, and 2 of the slots are for each receiving a spacer); in some embodiments the slots are open at the bottom and are not bounded at the bottom by the horizontal, bottom edge of the back plate; in some embodiments one or more of the slots are bounded by the substantially horizontal, bottom edge of the back plate and the bottom portion of the slot begins above the substantially horizontal, bottom edge of the back plate.

Referring to FIG. 4, a backside of a front plate 140 is depicted. Starting from the left, a channel for a spacer is shown, then a channel for a fastener, then a channel for a second fastener, and finally a channel for a spacer. There is no limit on the number of channels or slots that may be disposed within the back of the front plate, but in the preferred embodiments there is a first spacer slot, a second spacer slot, a first fastener slot, and a second fastener slot.

Figure 5:
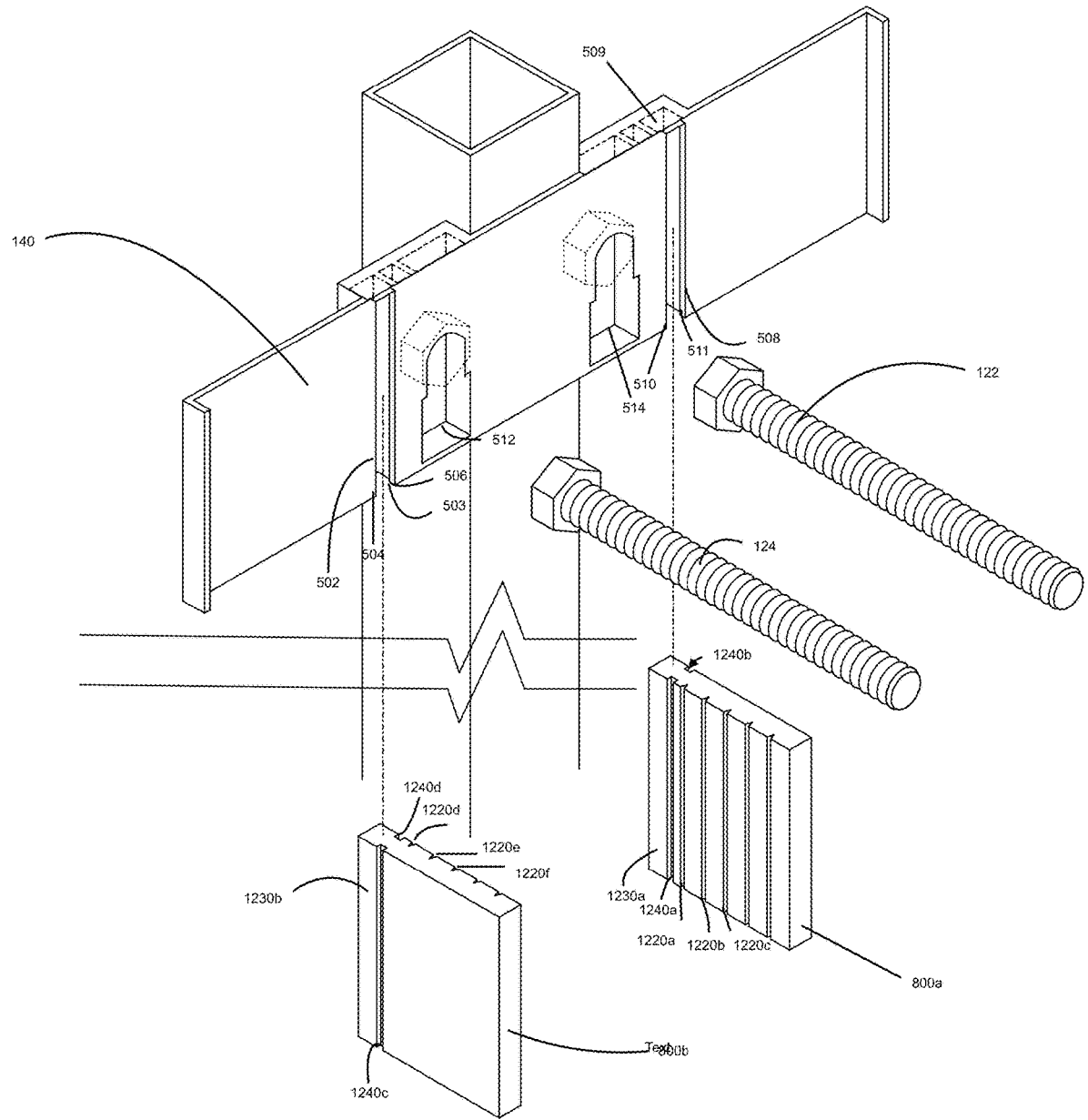
FIG. 5 shows an isometric view of the mountable watering assembly of FIG. 4

Referring to FIG. 5, a mountable watering assembly the front plate 140 may also have a first spacer slot 502 defining a slot cavity 503, the first spacer slot comprising a first spacer slot ledge 504 and a second spacer slot ledge 506 (the bottom of the slot may be open or closed; as shown in this FIG. 5, the first spacer slot 502 is open as well as the second spacer slot 508); a second spacer slot 508 defining a slot cavity 509, the second spacer slot comprising a third spacer slot ledge 510 and a fourth spacer slot ledge 511; a first fastener slot 512 wherein a lower horizontal length of the first fastener slot 512 is greater than the upper horizontal length of the first fastener slot 512; a second fastener slot 514 wherein a lower horizontal length of the second fastener slot 514 is greater than the upper horizontal length of the second fastener slot 514.

A second fastener 124 may be disposed in the first fastener slot 512; the second fastener 124 may be inserted into the first fastener slot 512 at the lower portion of the first fastener slot 512, and a user may then lift the first fastener into the upper portion of the first fastener slot 512, in which the upper portion of the first fastener slot 512 is tapered or narrower than the bottom portion and thereby acts to buttress against the back portion of a head of a fastener, such as a hex nut, when a force is exerted on the main column member or when a force is exerted on the mounting assembly, such as a force that causes the front plate 140 to be pulled backwards or downwards. Likewise, a first fastener 122 may be disposed in the second fastener slot 514, as described in this paragraph for the second fastener and the first fastener slot. A first fastener is interchangeable with a second fastener. A slot may refer to a portion of a structure that defines a slot cavity. In some embodiments, a slot is the shape of a square or rectangle that is missing one side.

Each of the plates may be substantially flat, but in the preferred embodiments the plates, such as the front plate 140 of FIG. 5 have a ledge on each edge that may function to cause the front plate 140 to catch on a railing when a storm or other force may start pushing laterally on the main column member. Spacers (800a, 800b) are shown, which may be compressible and may be alterable. As shown in FIG. 5, a spacer may have a first notch on the first end that may be insertable into a channel or slot of the first plate that is configured for receiving a spacer. A spacer may have vertical grooves, such as the V-shaped grooves, that allow a human user to adjust the shape of the spacer by manually breaking off one or more sections of spacer at a groove or by using a tool such as a knife. The vertical grooves may be on one side or on both sides of the spacer.

Figure 6:
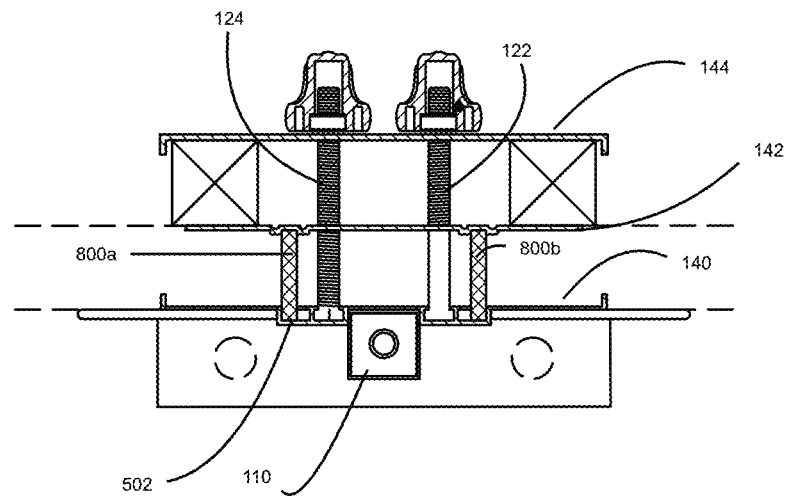
FIG. 6 shows a sectional view of FIG. 2B in which the tap has not been shown and the hosing or piping and connectors of FIG. 2B which are disposed within the main column member are not shown; see FIG. 2B for the broken line that depicts the plan upon which the sectional view is taken as well as the arrow showing the line of sight.

Referring to FIG. 6, a sectional view shows the arrangement of the front plate, spacer plate, and back plate. The spacer plate may buttress against one or more spacers; the spacer plate may provide a buttress portion at the bottom of one or more channels; the channels may be defined by ridges that run perpendicular to the length of the spacer plate. Typically, two parallel ridges define the edges of a channel, with the bottom of the channel being defined by the plates, such as the spacer plate. In some embodiments the ridges may be curved, pointed, or rectangular.

Referring to the embodiment shown in FIG. 7, a spacer (800a) is not included because the front plate 140 directly contacts the first rail (1200) and a second rail (1202); and the back plate also directly contacts the back side of the first rail and the second rail. In the preferred embodiments, the top of the front plate 140 is substantially free of channels, but since this is a sectional view the channel in which the first fastener and the channel in which the second fastener is disclosed are visible. Since the front plate 140 buttresses against the vertical rails, then spacers are not needed. In such a situation, the front plate 140 may or may not have a spacer slot. As shown in FIG. 7, a spacer slot is not depicted since some embodiments of the front plate 140 do not have a spacer lot for use with a railing system or section of a railing system that lacks a foot rail. With the absence of a foot rail, the vertically main column member may be placed sufficiently close to the vertical rails such that the front plate 140 which is attached to the main column member may then frictionally contact the rails while allowing the main column member to stand substantially vertical, that is substantially at a 90-degree angle to the deck floor or other floor upon which the main column member rests. The main column member may directly rest on a floor; in the preferred embodiments the main column member may have a base that may have rubber feet or other types of feet that may be in contact with the floor. (Hose connectors may be a brass hose fitting, and the main column member and the base may be made from plastic, metal, or other type of durable material. The sillcock may be brass or some other metal or plastic.)

Referring to FIG. 7, A simple mounting assembly 300 may comprise
a first fastener 122; a second fastener 124; an elongated back plate 144
a first fastener capping assembly 126 (which may include a hex-nut holder 129a and a hex nut 131a such as a ⅜-inch hex nut); a second fastener capping assembly 128 (which may include a hex-nut holder 129b and a hex nut 131b such as a ⅜-inch hex nut); and,
a base 1218 selected from a group consisting of a detachable base comprising at least one foot, an undetachable base, a plate, a plate comprising at least one foot, and an arched base 1216.

A simple mounting assembly may have a first fastener 122, a second fastener 124, the front plate 140, a back plate 144, a first fastener capping assembly 126, a second fastener capping assembly 128, wherein the first fastener 122 may be coupled to the front plate 140, the back plate 144, and the first fastener capping assembly 126, wherein the second fastener 124 may be coupled to the front plate 140, the back plate 144, and the second fastener capping assembly 128.

Referring back to FIG. 1, some ranges of sizes are provided. For any sizes or ranges that provided, the ultimate ranges are within 5000 percent of the listed numbers. The rubber feet or other type of feet which may be in contact with a base 1218 and also a floor may be ¾ inches in diameter to 0.5 square inches. Preferably, when a flat base 1218, such as a plate, is used, rubber feet may be used to decrease or prevent wobble and may results in a 2-point deck contact. The area of the rubber feet may be ¼ square inch to 4 square inches. The main column member may be between three inches and 300 inches in height with a preferred height range of 18 inches to 32 inches. The walls of the main column member may be between 0.1 inches and 50 inches with a preferred range of 0.8 inches to 2.3 inches. Hosing, pipes, or piping that may be disposed within the main column member may between 0.2 inches and 3 inches in diameter with a preferred diameter of 0.5 inches to 0.75 inches. The tap may be a fixed or replaceable sillcock, or hose bibb, made from metal or plastic, such as brass. The fasteners may be fasteners and may be any type of fastener between a 0.25-inch fastener to a 50-inch fastener, but in preferred embodiments the fastener is a 4-inch or 6-inch fastener. The shaft of the bolt or fastener may have a length ranging between 0.1 inches to 5000 inches with a preferred range between 0.8 inches and 30 inches and between 2 inches and 10 inches. In some embodiments the front plate, the spacer plate, and the back plate may generally have dimensions between 1 inch in height and 15 inches in length, with the preferred embodiments being 2 inches in height by 8 inches in length or 2 inches in height by 7 inches in length. Plates may be between 0.5 inches and 3 inches tall and may between 5 inches and 9 long; thickness may vary between 0.1 inches to 50 inches, with preferred ranges be between 0.25 inches and 2 inches. Compression spacers may vary in their size such as 11.5 inches by ¼ inches thick and the length may be adaptable between 0.1 inches and 40 inches. In the preferred embodiments the length is between 1 inch and 10 inches, and the spacers may have vertical grooves that are spaced between 0.1 inches and 12 inches apart, with a preferred spacing distance of 0.25 inches; a user may break the spacer at the groove by bending or using other types of force to reduce the length of the spacer thereby adapting it for use in various railing systems that have different types of foot rails of varying length and width and height. Hose connectors may be male or female hose connectors.

The base 1218 may be between 5 inches and 10 inches long with a width that may be between ½ inches to 3 inches. The shape of the base 1218 may vary, such as an arched base 1216 that may have rubber feet and may have 2 points of contact with a floor.

In the preferred embodiments a kit is provided with two optional sizes of ⅜ inch hex bots (2-½ inch and 4 inch) and two optional sizes of back plates that may be 6 inch or 8 inch. As known in the construction industry, O.C. spacing is common and "4-inch O.C. spacing and 6-inch O.C. spacing, as well as other types of spacing may be used. Three-point mounting may be used too such that three individual rubber feet may be mounted to the bottom of a base 1218. The base 1218 and its rubber feet may then be disposed upon a deck floor or other floor. Railing may also be balusters. The examples that are given are only illustrative and nonlimiting since various types of other embodiments are contemplated by this disclosure and the claims Referring to FIG. 15, an alternative embodiment of a base with two rubber feet is shown.

Referring to FIG. 16, an alternative embodiment of an arched base (1216) is shown.

Referring to FIG. 17, a tap is near a threaded portion of an outlet 200; threaded flanges extend the threaded portion of the outlet; FIG. 17 is an enlarged version of the tap and outlet 200 shown in FIG. 19.

Referring to FIG. 18, a hose connector is near a threaded inlet like threaded inlet 202.

Referring to FIG. 19, an embodiment of a mountable watering assembly 100 is disclosed. The mountable watering assembly 100 of FIG. 19 is similar to the mountable watering assembly 100 depicted in FIG. 1; however, in FIG. 19 the depicted embodiment may conduct water directly through the main column member 110 without having a pipe, hose or other conduit disposed within the main column member 110. The mountable watering assembly 100 may have a tap 102 (a tap may be a hose bibb, a spigot, a sillcock, or a similar device having a valve for controlling the flow of a liquid); a main column member 110 comprising a substantially-perpendicular elongated front plate 140, the main column member 110 may be substantially hollow and configured to conduct a body of flowing fluid; the main column member 110 may have an upper threading flange 204, which may be a nut or threaded flange for detachably coupling an inlet 202 of the main column member 110 to a threaded portion 208 of a tap, and a lower threading element 206, (the lower threading element 206, which may be a nut or threaded flange, may be coupled to the lower inlet 202) may extend the threaded surface of the lower inlet 202 beyond the length of the wall of the main column member 110, and thereby allowing a tap, sillcock, threaded hose, or connector to be detachably coupled to the outlet 200); the upper threading flange 204 may extend the threaded surface of the upper outlet 200 thereby allowing a tap, sillcock, threaded hose, or connector to be detachably coupled to the upper outlet 200. upper outlet 200 and lower inlet 202 may be threaded. A hose connector 210, which may be a conduit connector, may have a threaded end for coupling with the threaded portion of the lower inlet 202. The main column member 110 may be detachably coupled to an upper cover 212 and may be detachably coupled to a lower cover 214. Although not shown in FIG. 19, main column member 110 may be coupled or detachably coupled to a base, such as the bases depicted in FIG. 15 and FIG. 16.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A mountable watering assembly configured for mounting to one or more rails, the mountable watering assembly comprising:
   a main column member coupled to a front plate of a mounting assembly
   a tap coupled to a tap connector comprising a first elbow connector of a water conduit assembly wherein a first end of the water conduit assembly is coupled to the first elbow connector being at least partially disposed within the main column member and wherein a second end of the water conduit assembly is coupled to a second elbow connector being at least partially disposed within the main column member; a hose connector coupled to an object comprising the second elbow connector of the water conduit assembly; and, a base coupled to the main column member,
   and,
   a base coupled to the main column member, the base selected from a group consisting of a detachable based comprising at least one foot, an undetachable base, a plate, the plate comprising at least one foot, and an arched base, wherein the mounting assembly is a simple mounting assembly comprising
   a first fastener, a second fastener, the front plate, a back plate, a first fastener capping assembly, a second fastener capping assembly, wherein the first fastener is coupled to the front plate, the back plate, and the first fastener capping assembly, wherein the second fastener is coupled to the front plate, the back plate, and the second fastener capping assembly.

2. The mountable watering assembly of claim 1 wherein the base is the plate comprising two rubber feet.

3. The mountable watering assembly of claim 1 wherein the front plate comprises
   a first spacer slot defining a slot cavity, the first spacer slot comprising a first spacer slot ledge and a second spacer slot ledge
     a second spacer slot defining a slot cavity, the second spacer slot comprising a third spacer slot ledge and a fourth spacer slot ledge;
   a first fastener slot wherein a lower horizontal length of the first fastener slot is greater than an upper horizontal length of the first fastener slot;
   a second fastener slot wherein a lower horizontal length of the second fastener slot is greater than the upper horizontal length of the second fastener slot.

4. The mountable watering assembly of claim 3, further comprising a panel assembly, the panel assembly comprising at least one panel selected from a group consisting of an upper panel coupled to an upper half of the mountable watering assembly and a lower panel coupled to a lower half of the mountable watering assembly.

5. The mountable watering assembly of claim 1, wherein the front plate is detachably coupled with a substantially horizontal first rail, is coupled with the first fastener, is coupled with the second fastener, and is detachably coupled with a substantially horizontal second rail, wherein the back plate is detachably coupled with the first rail and the second rail, wherein the first fastener is capped by the first fastener capping assembly and disposed within a first aperature of a back plate and wherein the second fastener is capped by the second fastener capping assembly and disposed within a second aperature of the back plate coupled to the first fastener and coupled to the second fastener.

6. The mountable watering assembly of claim 1 wherein the main column member is between 18 inches to 32 inches in height.

7. The mountable watering assembly of claim 1 wherein the mounting assembly is a complex mounting assembly comprising a first compressible spacer, a second compressible spacer, a spacer plate, a first fastener, a second fastener, the front plate, a back plate, a first fastener capping assembly, a second fastener capping assembly wherein the first fastener is coupled to the front plate, the back plate, and the first fastener capping assembly wherein the second fastener is coupled to the front plate, the back plate, and the second fastener capping.

8. The mountable watering assembly of claim 7, wherein the first compressible spacer further comprises
- at least three vertical-length grooves;
- a first notch,
- a first channel adjacent to the first notch and configured to mate with the front plate,
- a second channel adjacent to the first notch and configured to mate with the front plate;

wherein the second compressible spacer further comprises at least three vertical-length grooves;
- a second notch;
- a third channel adjacent to the second notch and configured to mate with a first spacer slot of the front plate; and,
- a fourth channel adjacent to the second notch and configured to mate with the front plate.

9. The mountable watering assembly of claim 8 wherein the first compressible spacer has a hand-broken edge.

10. The mountable watering assembly of claim 9 further comprising a panel assembly, the panel assembly comprising at least one panel selected from a group consisting of an upper panel coupled to an upper half of the mountable watering assembly, a lower panel coupled to a lower half of the mountable watering assembly, and an upper panel coupled to the upper half of the mountable watering assembly and a lower panel coupled to the lower half of the mountable watering assembly.

11. The mountable watering assembly of claim 10 further comprising a column cap detachably coupled to an upper end of the main column member.

12. The mountable watering assembly of claim 11 wherein the spacer plate comprises a first ridge substantially perpendicular to a main length of the elongated spacer plate, a second ridge substantially perpendicular to the length of the elongated spacer plate, a third ridge substantially perpendicular to the length of the elongated spacer plate, a fourth ridge substantially perpendicular to the length of the elongated spacer plate, wherein the first ridge and the second ridge collectively define a first channel, wherein the third ridge and the fourth ridge collectively define a second channel.

\* \* \* \* \*